United States Patent [19]

Saxon

[11] 4,125,379
[45] Nov. 14, 1978

[54] APPARATUS FOR SOLVENT EXTRACTION
[75] Inventor: Arthur F. Saxon, Pittsburgh, Pa.
[73] Assignee: Dravo Corporation, Pittsburgh, Pa.
[21] Appl. No.: 717,635
[22] Filed: Aug. 25, 1976
[51] Int. Cl.$^2$ .......................................... B01D 11/02
[52] U.S. Cl. ...................................... 422/269; 127/5
[58] Field of Search ............. 23/269 V, 269 R, 272.5; 127/2, 3, 4, 5, 6

[56] References Cited

U.S. PATENT DOCUMENTS

| | | | |
|---|---|---|---|
| 2,840,459 | 6/1958 | Karnofsky | 23/270 R |
| 3,248,263 | 4/1966 | Silver | 23/269 V |
| 3,533,837 | 10/1970 | Strich | 127/5 |
| 3,697,324 | 10/1972 | Steele | 127/4 |
| 3,851,087 | 11/1974 | Nowlin | 23/269 |
| 3,860,395 | 1/1975 | Kehse | 23/269 V |

FOREIGN PATENT DOCUMENTS 7,066 of 1899 United Kingdom ...................... 23/269

Primary Examiner—Stephen J. Emery
Attorney, Agent, or Firm—Marn & Jangarathis

[57] ABSTRACT

There is disclosed an improved rotary extractor assembly comprised of a rotor positioned within a vapor tight vessel and having upper and lower wheel assemblies positioned along the periphery thereof, which wheel assemblies ride on upper and lower track assemblies mounted to the inner surface of the vessel.

3 Claims, 3 Drawing Figures

APPARATUS FOR SOLVENT EXTRACTION

The invention relates to an apparatus for the treatment of particulate materials with a solvent, and more particularly to an improved apparatus for the extraction of oils and/or soluble material from solids by the use of liquid solvents.

BACKGROUND OF THE INVENTION

In U.S. Pat. No. 2,840,459, there is disclosed a process and apparatus for the continuous extraction of oils and/or soluble materials comprised of a large vessel forming a vapor-tight enclosure in which there is disposed a rotor including a plurality of cells formed by radially disposed inner walls extending toward and mounted to peripherally-disposed end walls. The bottom of each cell is provided with a hinged-door assembly including associated equipment for opening and closing each cell. Drainage compartments generally underlie the cells for collecting miscella, i.e. a solution of oil and solvent.

Such apparatus has found wide acceptance, with the design unit quantity of material capable of being treated per hour being a function of the diameter of the rotor. The rotor is supported by thrust bearings mounted on a housing. The size of such bearings incrementally increase with increasing diameter of the rotor with structural housing requirement in terms of weight also incrementally increasing with increasing diameter of the rotor, consequentially limiting as a practical matter the maximum diameter of a rotor and thus maximum design capacity thereof for the designed material being treated.

OBJECTS OF THE INVENTION

An object of the present invention is to provide an improved rotary extractor assembly.

Another object of the present invention is to provide an improved rotary extractor assembly having greater material handling capabilities.

Still another object of the present invention is to provide an improved rotary extractor assembly which substantially reduces structural requirements.

SUMMARY OF THE INVENTION

These and other objects of the present invention are achieved by an improved rotary extractor assembly comprised of a rotor positioned within a vapor tight vessel and having upper and lower wheel assemblies positioned along the periphery therof, which wheel assemblies ride on upper and lower track assemblies mounted to the inner surface of the vessel.

Further objects and advantages of the invention will become apparent upon consideration of the detailed disclosure thereof, especially when taken with the accompanying drawings.

Figure 1:
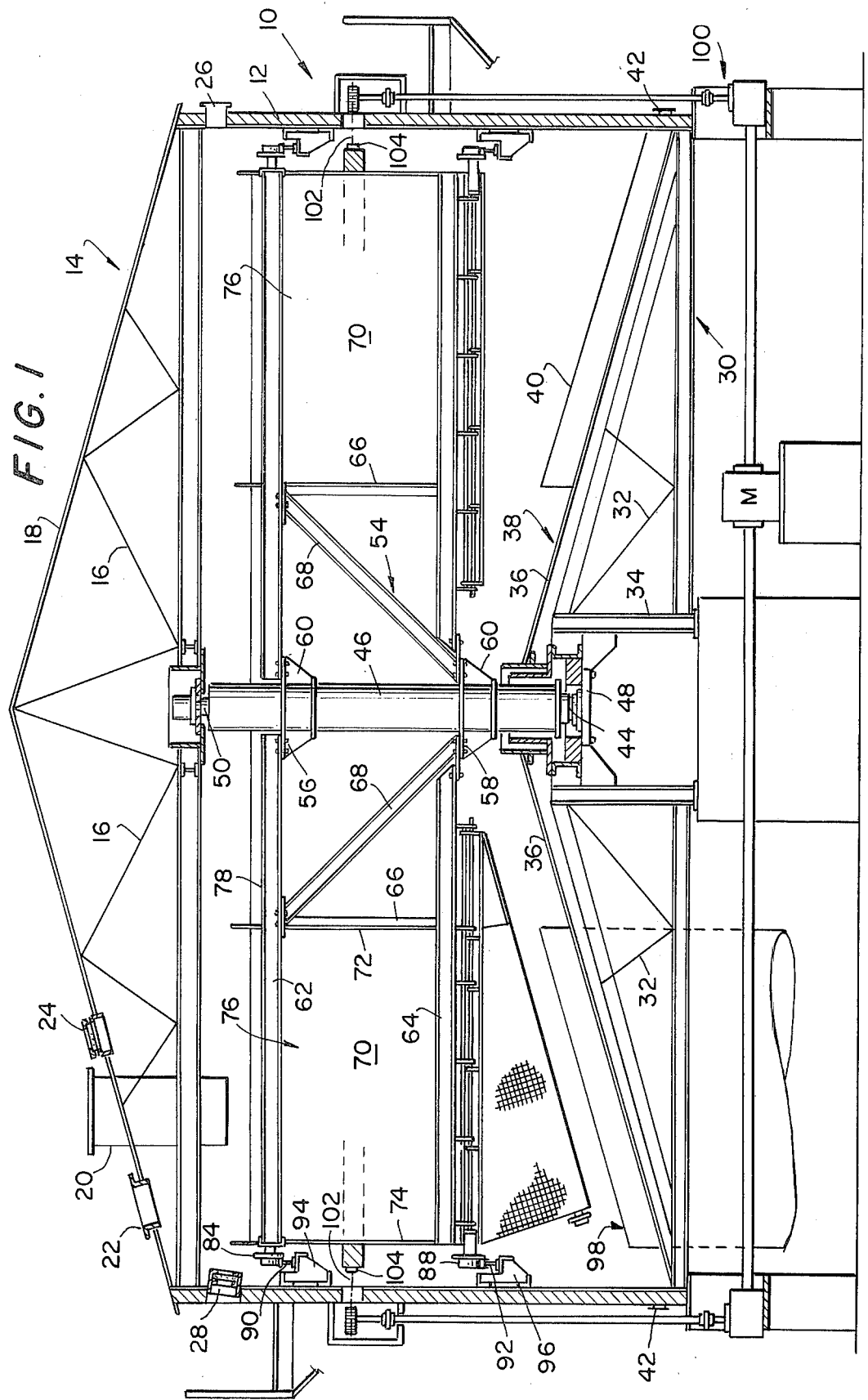
FIG. 1 is a cross-sectional view (partly schematic) in elevation taken substantially through the center of an extractor assembly illustrating the basic elements thereof.

Referring to the drawings there is provided an extractor assembly generally indicated as 10, comprised of a cylindrical casing or vessel 12 positioned on a suitable foundation and having a trussed roof mounted thereon, generally indicated as 14, and which is comprised of a plurality of radially extending roof truss members, generally indicated as 16, on which are mounted plate member 18. The roof 14 is provided with a feed chute 20, manhold access ways 22 and visual access assemblies 24. The vessel 12 is similarly provided with manhold access way 26 and looking glass assemblies 28 all positioned for access and visual inspection of the operation of the extractor 10. The bottom of the extractor 10, generally indicated as 30, is comprised of a plurality of radially extending cone truss members, generally indicated as 32, mounted to a rotor bearing support 34 positioned on a suitable foundation. On the cone truss members 32 there are mounted cone plate members 36 forming a generally conically shaped sloping bottom wall, generally indicated as 38. Mounted to the cone plate members 36 are vertically standing plates 40 positioned there around forming a plurality of solvent collection zones having outlets 42, such as disclosed in the hereinabove mentioned Letters Patent. To prevent solvent loss, the extractor 10 including the vessel 12, roof 14 and bottom 30 is generally sealed to enable the extractor 10 to be operated below or above atmospheric pressure.

A lower guide shaft 44 is vertically mounted to a rotor shaft 46 and is journalled for rotation in a combination of a thrust bearing and radial bearing 48 positioned within the rotor bearing support 34. An upper guide shaft 50 is vertically mounted to the rotor shaft 46 for temporary alignment only in the radially extending roof truss members 16. Suitable lubrication and conventional vapor seals (not shown) are provided for guide shaft 44 and for the envelope of the extractor assembly 10.

The rotor shaft 46 supportably forms a part of a rotor in the form of a spool frame, generally indicated as 54. Upper and lower ring flanges 56 and 58, respectively, are welded to rotor shaft 46 above brackets 60 circumferentially and radially spaced around shaft 46. The spool frame 54 is comprised of rigidly connected and radially extending cell support beams 62 and hinge support beams 64 fastened to ring flanges 56 and 58, respectively. Vertically disposed struts 66 are positioned intermediate the cell support beams 62 and hinge support beam 64. Radially extending struts 68 are mounted at one end to the ring flange 58 and at the other end to the cell support beams 62 proximate to the juncture of the struts 66 to the cell support beams 62. The beams and struts are either welded or bolted together in rigid structure to form the spool frame 54 which provides support for cells 70 of the extractor assembly 10 adapted to contain solid material to be contacted by an extraction solvent, as is known to one skilled in the art.

Figure 2:
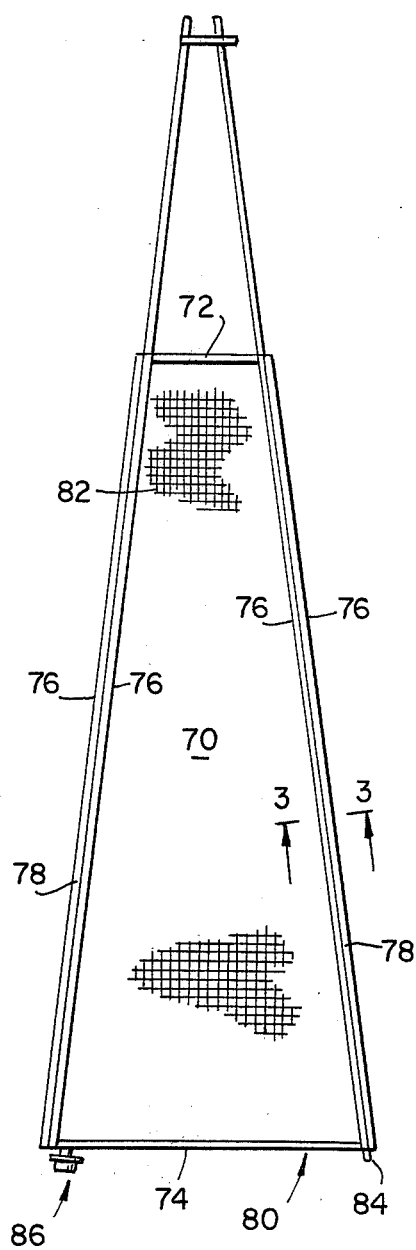
FIG. 2 is a plan view of a cell of the extractor assembly of FIG. 1.
Figure 3:
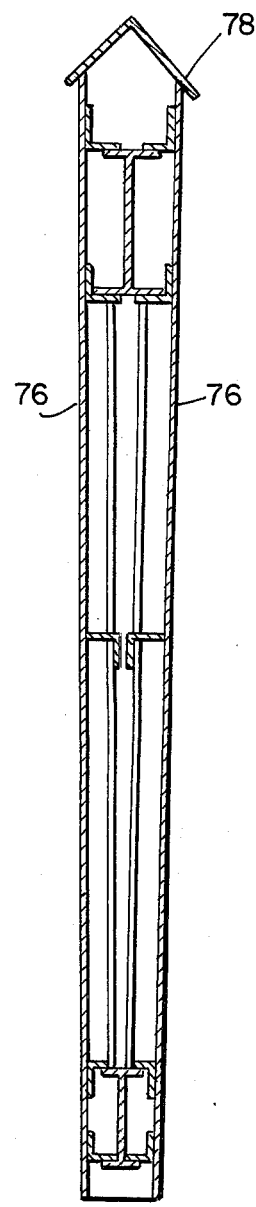
FIG. 3 is a cross-sectional view of a side wall of the cell of FIG. 2 taken along the lines 3—3 thereof.

Each cell 70 is open at the top and substantially sector-like in plan and is comprised of vertically disposed inner and outer walls 72 and 74 (See FIG. 2) and radially and vertically disposed paired side walls 76. The paired side walls 76 are substantially vertical and incline inwardly towards the bottom (See FIG. 3) of the respective cells to minimize the tendency of solids to cling thereto. A gabled cap 78 is fixedly positioned on the top of each of the upper edges of the paired side walls 76 to assist in the abrupt transfer of liquid from a preceding cell to an immediately succeeding cell and also to prevent material from falling between adjoining walls.

The bottom of each cell 70 is trapezoidally-shaped and is enclosed by a hingedly attached door assembly, generally indicated as 80, including a mesh screen 82 of a preselect size for the material undergoing treatment. A hinge pin 84 is provided on each door assembly positioned about an edge adjacent the bottom of each cell to enable the door assembly to swing about the lower leading edge of each cell. Journaled on the respective ends of the door assemblies 80 to the cell support beams 62 and hinge support beam 64 are a rotor wheel 86 and a cell door wheel 88, respectively, supportably engaged by rotor wheel track 90 and cell wheel track 92. The rotor wheel track 90 is peripherally mounted by rotor wheel track support brackets 94 to the inner wall of the vessel 12 with the cell wheel track 92 being mounted to the inner wall of the vessel 12 by cell wheel track support brackets 96. The rotor wheel track 90 is supportably engaged about the full periphery of the vessel 12 whereas the rotor wheel track 90 is supportably engaged for that portion of the path of rotation of the cells 70 during which the door assemblies 80 are kept substantially in a closed position.

In the closed position the screen 82 prevents any discharge of the solid material contents of the cells 70 while permitting the draining of liquid therefrom. When the door assemblies 80 are to be respectively opened to discharge or empty solid material in the cells 70, which occurs successively, the cell wheel track 92 is terminated at a predetermined position whereat by gravity the respective door assembly 80 is caused to open thereby emptying the solid material contents of the respective cell 70 into a residue chute, generally indicated as 98 and falls into a sealed residue conveyor (not shown) to be removed for further processing. The continued movement of the spool frame 54, and consequently of the cells 70, after discharge, cause cell wheel 88 to engage an inclined portion of the cell wheel track 92 thereby elevating the door assemblies 80 into a closed position. Movement of the cells 70 within the vessel 12 is effected by a motor and gear reducing assembly, generally indicated as 100, which drives a chain 102 about a chain receiving assembly 104, mounted about the outer walls 74 of the spool frame 54 to drive the spool frame 54, generally in a clockwise direction when viewed from the top.

As hereinabove mentioned, there is provided a plurality of radially extending divider wall 40 mounted to the bottom plate members 36 of the extractor 10 to form a series of compartments inclusive beneath the cells 70, which compartments provide zones for the collection of solvent solutions of varying extract strengths. Above one compartment defining a miscella collection zone, there is provided an inverted V-shaped screen (not shown) which functions to separate fines from the primary flow of miscella passing therethrough. The fines together with minor quantities of miscella are caused to flow off such a screen adjacent miscella collection compartments from which the fines may be washed, such as by adjustable nozzles (not shown). Miscella is withdrawn from the miscella collection compartment and passed to miscella storage tank (not shown) for further processing.

In operation, solid organic particulate material, such as fresh soybean flakes, are continuously introduced into the extractor assembly 10 through the chute 20 mounted to and extending through the roof 14 to discharge the particulate material over the approximate center of each cell 70 passing therebeneath. The conduit 20 may be liquid tight so that a liquid may be introduced with the particulate material to be treated thereby effecting soaking of the material prior to treatment in the extractor assembly 10. The solids are successively contacted with continuous streams of miscella of diminished strength through the succession of manifolds assemblies to effect generally a counter-current extraction process. As the leading edge of a cell 70 approaches the discharge chute 96, the cell wheel 88 of the cell assembly 80 rides down the terminal portion of the cell wheel track 92 to eventually cause the door to open thereby permitting the particulate material to drop into the discharge chute 98. It will be understood that the door stops and like assemblies are included to facilitate the opening and closing of the door assemblies with controlled impact to the extractor assembly 10. It will be noted that the chain 102 assembly is shown driven at two or more positions at points separated from each other to provide for smooth operation and a division in power requirements, but a single drive may be used where power requirement permits.

What is claimed:

1. In a solvent extractor including a vapor tight vessel in which is disposed a plurality of cells formed by a plurality of radially extending walls arranged in circumferential fashion on a generally horizontal plane around a vertical extending rotor, a feed conduit for introducing into said cells solids to be treated, a solids-retaining bottom closure for each cell, a track to maintain said bottom closures in substantially closed position during a predetermined section of a rotational path of each cell, conduits for successively introducing a solvent into said cells from above said predetermined section of said rotational path, a liquid collection zone disposed beneath said cells and including a plurality of compartments for receiving solvent, the improvement characterized by:

providing said radially extending walls with a horizontally extending support member mounted about the upper portion of each of said walls, said support member being provided with a roller member proximate to said vessel; and an upper track member circumferentially disposed internally about said vessel whereby said roller members of said support member supportably engage said upper track member.

2. The solvent extractor as defined in claim 1 wherein said cells are provided with a gear tooth member horizontally and circumferentially disposed about said vessel and wherein an endless chain member engages said gear tooth member and wherein said chain member is engaged by one gear assembly or more disposed approximately opposite each other and wherein said gear assemblies are driven by at least one motor.

3. The solvent extractor as defined in claim 1 wherein said support member is affixed to said rotor shaft by a horizontal extending disc member mounted to said rotor shaft.

* * * * *